(12) United States Patent
Dürsteler López et al.

(10) Patent No.: US 9,170,433 B2
(45) Date of Patent: Oct. 27, 2015

(54) METHOD FOR DESIGNING AND MANUFACTURING A MONOFOCAL OPHTHALMIC LENS AND CORRESPONDING LENS

(71) Applicant: INDO INTERNACIONAL S.A., Sant Cugat del Vallés, Barcelona (ES)

(72) Inventors: Juan Carlos Dürsteler López, Barcelona (ES); Javier Vegas Caballero, Barcelona (ES); Manuel Espínola Estepa, Barcelona (ES); Sara Chamadoira Hermida, Pontevedra (ES); Glória Casanellas Peñalver, Barcelona (ES)

(73) Assignee: INDO OPTICAL S.L., Sant Cugat Del Vallès, Barcelona (ES)

( * ) Notice: Subject to any disclaimer, the term of this patent is extended or adjusted under 35 U.S.C. 154(b) by 158 days.

(21) Appl. No.: 13/720,419

(22) Filed: Dec. 19, 2012

(65) Prior Publication Data

US 2013/0155374 A1 Jun. 20, 2013

(30) Foreign Application Priority Data

Dec. 19, 2011 (ES) .................................. 201132048

(51) Int. Cl.
*A61B 3/103* (2006.01)
*G02C 7/02* (2006.01)

(52) U.S. Cl.
CPC ........ *G02C 7/028* (2013.01); *G02C 7/02* (2013.01); *G02C 7/024* (2013.01)

(58) Field of Classification Search
CPC .......... G02C 7/02; G02C 7/028; G02C 7/021; G02B 3/06

USPC ......................................... 351/159.74–159.77
See application file for complete search history.

(56) References Cited

U.S. PATENT DOCUMENTS

| 3,960,442 A | 6/1976 | Davis et al. |
| 5,083,859 A | 1/1992 | Jalie |
| 5,436,680 A * | 7/1995 | Volk .............................. 351/219 |

(Continued)

FOREIGN PATENT DOCUMENTS

| ES | 2 337 970 | 9/2007 |
| WO | WO 2009/040452 | 4/2009 |

OTHER PUBLICATIONS

Delphion Summary of ES2337970 including English Abstract.

*Primary Examiner* — Scott J Sugarman
*Assistant Examiner* — Danielle Manikeu
(74) *Attorney, Agent, or Firm* — Staas & Halsey LLP (57) ABSTRACT

A method for designing and manufacturing a monofocal ophthalmic lens and corresponding lens. A surface of the monofocal ophthalmic lens is defined by:

$$f(x,y)=a_1+a_2\sqrt{1-a_3x^2-a_4y^2}+a_5\exp\{a_6x^4+a_7y^4+a_8x^2y^2\}$$

wherein x and y are perpendicular optical axes of the lens in a plane, wherein $a_1$-$a_8$ are coefficients, and wherein $a_5$ is other than 0 and at least one of $a_6$, $a_7$ and $a_8$ is other than 0, including a hyperbolic component and an exponential component. The coefficients can be calculated by an iterative calculation and the merit function as follows:

$$fm = \left[\sum_i \alpha_i m_i^2(\beta)\right]^{1/2}$$

where $m_i$ is a value of an optical property at a specific viewing angle $\beta$ with respect to an optical axis of the lens, and $\alpha_i$ is a weighting value.

14 Claims, 14 Drawing Sheets

(56) References Cited

U.S. PATENT DOCUMENTS

| | | | |
|---|---|---|---|
| 5,815,237 A * | 9/1998 | Vayntraub | 351/159.1 |
| 5,825,454 A | 10/1998 | Yamakaji et al. | |
| 7,111,938 B2 * | 9/2006 | Andino et al. | 351/212 |
| 2002/0196410 A1 * | 12/2002 | Menezes | 351/168 |
| 2006/0132708 A1 | 6/2006 | Landgrave et al. | |
| 2008/0013043 A1 * | 1/2008 | Ye et al. | 351/160 R |

* cited by examiner (a)

| a1(mm) | 0 |
| --- | --- |
| a2(mm) | 293 |
| a3(mm⁻²) | 0,000007 |
| a4(mm⁻²) | 0,000007 |
| a5(mm) | 293 |
| a6(mm⁻⁴) | 2,39E-09 |
| a7(mm⁻⁴) | 2,39E-09 |
| a8(mm⁻⁴) | 4,78E-09 |

| a1(mm) | 0 |
| --- | --- |
| a2(mm) | 293 |
| a3(mm⁻²) | 0,000007 |
| a4(mm⁻²) | 0,000018 |
| a5(mm) | 293 |
| a6(mm⁻⁴) | 2,40E-09 |
| a7(mm⁻⁴) | 2,55E-09 |
| a8(mm⁻⁴) | 4,92E-09 |

| a1(mm) | 0 |
|---|---|
| a2(mm) | 91 |
| a3(mm$^{-2}$) | 0,00013 |
| a4(mm$^{-2}$) | 0,00016 |
| a5(mm) | 91 |
| a6(mm$^{-4}$) | -1,94E-09 |
| a7(mm$^{-4}$) | -7,60E-10 |
| a8(mm$^{-4}$) | -2,07E-09 |

| a1(mm) | 0 |
| --- | --- |
| a2(mm) | 123 |
| a3(mm$^{-2}$) | 0,000061 |
| a4(mm$^{-2}$) | 0,000061 |
| a5(mm) | 123 |
| a6(mm$^{-4}$) | 2,51E-09 |
| a7(mm$^{-4}$) | 2,47E-09 |
| a8(mm$^{-4}$) | 3,10E-09 |

| a1(mm) | 0 |
| --- | --- |
| a2(mm) | 215 |
| a3(mm-2) | 0,000016 |
| a4(mm-2) | 0,000016 |
| a5(mm) | 215 |
| a6(mm-4) | 2,47E-09 |
| a7(mm-4) | 3,10E-09 |
| a8(mm-4) | -2,04E-09 |

| a1(mm) | 0 |
| --- | --- |
| a2(mm) | 51 |
| a3(mm$^{-2}$) | 0,00038 |
| a4(mm$^{-2}$) | 0,00038 |
| a5(mm) | 51 |
| a6(mm$^{-4}$) | 3,10E-09 |
| a7(mm$^{-4}$) | 3,10E-09 |
| a8(mm$^{-4}$) | 6,21E-09 |

| a1(mm) | 0 |
| --- | --- |
| a2(mm) | 85 |
| a3(mm-2) | 0,00014 |
| a4(mm-2) | 0,00014 |
| a5(mm) | 85 |
| a6(mm-4) | -2,04E-09 |
| a7(mm-4) | -2,04E-09 |
| a8(mm-4) | -4,08E-09 |

METHOD FOR DESIGNING AND MANUFACTURING A MONOFOCAL OPHTHALMIC LENS AND CORRESPONDING LENS

CROSS-REFERENCE TO RELATED APPLICATIONS

This application is based upon and claims the benefit of priority from the prior Spanish Patent Application No. P201132048 filed on Dec. 19, 2011, the entire contents of which is hereby incorporated by reference.

The work that led to this invention was funded by the Seventh Framework Program of the European Community [PM7/2007-2013] according to grant agreement no. CT-212002.

FIELD OF THE INVENTION

The invention relates to monofocal lenses, more commonly known as spherocylindrical (or sphero-toric) lenses. These lenses correspond to optical elements with a constant power on the entire surface which are generally represented in ophthalmic optics by means of sphere, cylinder and cylinder axis values. Specifically, the invention relates to methods for designing and manufacturing a monofocal ophthalmic lens. The invention also relates to monofocal ophthalmic lenses analytically defined by means of a specific function.

BACKGROUND

For the purpose of providing added value to lenses of this type, different designs have been developed over the years. These designs seek to correct aberrations perceived by the wearer due, among others, to placing the lens in a specific position and inclination with respect to the eye. To that end monofocal designs which try to correct those possible aberrations introduce variations into the geometry of the spherotoric surface for the purpose of reducing said aberrations of the lens or equivalently increasing wearer comfort. These modifications can be, for example, introducing aspherical, aspherotoric or atoric surfaces to decrease oblique astigmatism; or the inclusion of a small addition in the lens to improve comfort in near vision.

The literature shows various possibilities for designing the new surfaces, the most common being those generated by conic curves:

$$c(y^2 + (1+Q)x^2) - 2x = 0$$

where c is the curvature of the surface at the source and Q is the asphericity. Depending on the value of Q it is possible to generate hyperbolic surfaces (Q<−1), parabolic surfaces (Q=−1), spherical surfaces (Q=0) and surfaces in the form of ellipsoids (−1<Q<0 or Q>0). With said conic curves it is possible to reduce different types of aberrations (oblique astigmatism, curvature of field, distortion, magnification, etc.) which are generated due to the position of the lens with respect to the eye.

Prior studies have established an angle α of 30° as a limit for the line of sight displacement with respect to the neutral position (corresponding to 0°), after which the wearer accompanies with head movements for the rotation to be made. Therefore, conic curves are generally used to minimize the weight of the aberrations taking into account a cone of vision forming the gaze direction of the wearer at 30°, because it is also known that if a 30° angle is corrected, all angles less than that have a considerably low aberration level. Even still, these optimizations are normally limited to certain prescription or base curve ranges or to cutting one or both surfaces of the lens.

Documents U.S. Pat. Nos. 3,960,442, 5,083,859, 5,825,454, US 2006/0132708 and ES 2,337,970 describe various examples.

SUMMARY OF THE INVENTION

Objects of the invention are to overcome these drawbacks. This is done by a method of design of the type indicated above wherein the surface is defined by the analytical function:

$$f(x,y) = a_1 + a_2 \sqrt{1 - a_3 x^2 - a_4 y^2} + a_5 \exp\{a_6 x^4 + a_8 x^2 y^2\}$$

wherein x and y are perpendicular optical axes of the lens in a plane, wherein $a_1$–$a_8$ are coefficients, and wherein $a_5$ is other than 0 and at least one of the coefficients $a_6$, $a_7$ and $a_8$ is other than 0.

Indeed, as can be seen this analytical function includes a hyperbolic part and an exponential part. Lenses defined by hyperbolic analytical functions are known, but what is novel is adding the exponential component to them. This exponential component allows correcting errors that cannot be corrected by other means. Specifically, the hyperbolic term is normally dominant in the central area of the lens whereas the exponential term primarily affects the outermost part. Furthermore, the exponential component can exert its influence in many different ways depending on the values of coefficients $a_5$, $a_6$, $a_7$ and $a_8$. As will be seen below, this analytical function allows obtaining much better results with respect to those known in the state of the art.

In a preferred embodiment of the invention, the coefficients are calculated by means of an iterative calculation including the following steps:

[a] setting a value for the refractive index of the ophthalmic lens and for the base curve that will be used to manufacture the ophthalmic lens,

[b] setting sphere, cylinder and cylinder axis values that the ophthalmic lens must meet,

[c] setting initial nominal values for the coefficients $a_1$-$a_8$,

[d] calculating at least one optical property of a lens with these nominal values preferably by ray tracing,

[e] calculating the value of a merit function by:

$$fm = \left[\sum_i \alpha_i m_i^2(\beta)\right]^{1/2}$$

where $m_i$ is the value of said optical property at a specific viewing angle β with respect to the optical axis of the lens, and $\alpha_i$, is a weighting value,

[f] optimizing the merit function by means of setting new nominal values for the coefficients $a_1$-$a_8$, and

[g] repeating steps [c] to [f] until obtaining the desired optimization level.

Indeed, the values of coefficients can thus be obtained for any lens and with the desired precision. That optical property or combination of optical properties considered most relevant in each case can further be chosen.

The merit function preferably includes the oblique astigmatism value at 30° and, advantageously, the $\alpha_i$, value for the oblique astigmatism value is between 0.8 and 0.98.

The merit function preferably includes the curvature of field value at 30° and, advantageously, the $\alpha_i$, value for the curvature of field value is between 0.02 and 0.2.

It is particularly advantageous that the merit function includes the two previous optical properties (oblique astigmatism and curvature of field). Indeed, the remaining aberrations normally present in the lenses are generally a combination of these two. Therefore the merit function is already reflecting any aberration of interest directly or indirectly.

Generally, the surface designed by the method according to the invention could be either the concave or the convex surface, but it is preferably the concave surface of the lens. In this case, the coefficients can be simplified, specifically $a_1$ can be made equal to 0, $a_2$ equal to the radius of curvature in the center of the surface with a negative sign, and $a_5$ equal to the radius of curvature in the center of the surface. Indeed, with these conditions it is assured that on one hand the function passes through point (0, 0, 0), and on the other hand that the lens has the desired power.

Each of the coefficients of the analytical function preferably has a value that is between +/−30% of the corresponding nominal value obtained from the optimization. Indeed, the method according to the invention allows calculating the coefficients with great precision, however, small deviations with respect to optimal values offer virtually identical satisfactory results. This has been demonstrated through a sensitivity analysis, in which variations have been introduced into the coefficients obtained (<30%) and both the height differences (z) of the new surfaces with respect to the original surfaces and the isometric lines of mean power and of astigmatism obtained by means of ray tracing have been analyzed. Different combinations of variations of the coefficients to which there have been applied both a reduction and an increase of the coefficients with respect to the exact values (those obtained from the iterative process) have been studied. The cases that have been studied are: reduction or increase of the coefficients of the hyperbola ($a_3$, $a_4$), reduction or increase of the coefficients of the exponential ($a_6$, $a_7$, $a_8$), reduction or increase of the even coefficients ($a_4$, $a_6$, $a_8$), reduction or increase of the odd coefficients ($a_3$, $a_7$), and reduction or increase of all the coefficients ($a_3$, $a_4$, $a_6$, $a_7$, $a_8$). This sensitivity analysis has been conducted by setting the values of coefficients $a_1$, $a_2$ and $a_5$, thereby setting the center of the surface and the curvature in the center of the surface, as discussed above. Different graduations have been chosen to that end. After analyzing the different cases, it is concluded that a mild variation (<30%) with respect to the coefficients of the hyperbola generates significant variations with respect to the graduation of the lens, therefore, they are very sensitive to small changes of said coefficients. In contrast, mild variations with respect to the coefficients accompanying the exponential do not provide significant variations with respect to the surfaces and, therefore, with respect to the lenses.

In another preferred embodiment of the invention, the values of the coefficients, specifically the values $a_6$, $a_7$, and $a_8$, are not calculated in the preceding method but rather they can be chosen directly from pre-established ranges. In this sense it is advantageous that $a_6$ has a value between $-2 \times 10^{-8}$ and $5 \times 10^{-8}$ mm$^{-4}$, that $a_7$ has a value between $-2 \times 10^{-8}$ and $1.2 \times 10^{-7}$ mm$^{-4}$, and/or that $a_8$ has a value between $-2 \times 10^{-8}$ and $1.2 \times 10^{-7}$ mm$^{-4}$. Indeed, it could be confirmed by means of the aforementioned sensitivity analyses that the results obtained were satisfactory within the indicated ranges because the results obtained in all the analyzed cases are equivalent, so any other possible combination of mild variations of coefficients will generate the same result. Other analysis in which the coefficients associated with the hyperbolic part were not modified and, in contrast, the values associated with the exponential part ($a_6$, $a_7$, $a_8$) were more profoundly modified until reaching differences of 600% with respect to the value obtained from the iterative process, have additionally been conducted. The results obtained confirm that for the values $a_6$, $a_7$, $a_8$, the indicated ranges are those which allow obtaining lenses with the improved optical properties.

Another object of the invention is a method for manufacturing a monofocal ophthalmic lens, including a step of machining a surface of the ophthalmic lens where the surface is defined by the analytical function:

$$f(x,y)=a_1+a_2\sqrt{1-a_3x^2-a_4y^2}+a_5\exp\{a_6x^4+a_7y^4+a_8x^2y^2\}$$

The advantages of this analytical surface have already been discussed above. In this sense it is particularly advantageous that the coefficients are the coefficients which can be obtained by of the method of design according to the invention.

Another object of the invention is to provide a monofocal ophthalmic lens, having a surface defined by the analytical function:

$$f(x,y)=a_1+a_2\sqrt{1-a_3x^2}-a_5\exp\{a_6x^4+a_7y^4+a_8x^2y^2\}$$

the advantages of which have already been discussed above. As indicated above, the coefficients are advantageously the coefficients which can be obtained by means of the method of design according to the invention.

BRIEF DESCRIPTION OF THE DRAWINGS

Other advantages and features of the invention can be seen in the following description in which preferred embodiments of the invention are described in a non-limiting character, referring to the attached drawings. In the figures:

FIGS. 5(a) and (b) show mean power and astigmatism maps, respectively, every 0.25 D, up to 30° obtained with an analytical surface with the coefficients of FIG. 4.

FIGS. 7(a) and (b) show mean power and astigmatism maps, respectively, every 0.25 D, up to 30° obtained with an analytical surface with the coefficients of FIG. 6.

FIGS. 9(a) and (b) show mean power and astigmatism maps, respectively, every 0.10 D, up to 30° obtained with an analytical surface with the coefficients of FIG. 8.

DETAILED DESCRIPTION OF THE PREFERRED EMBODIMENTS

Figure 1:
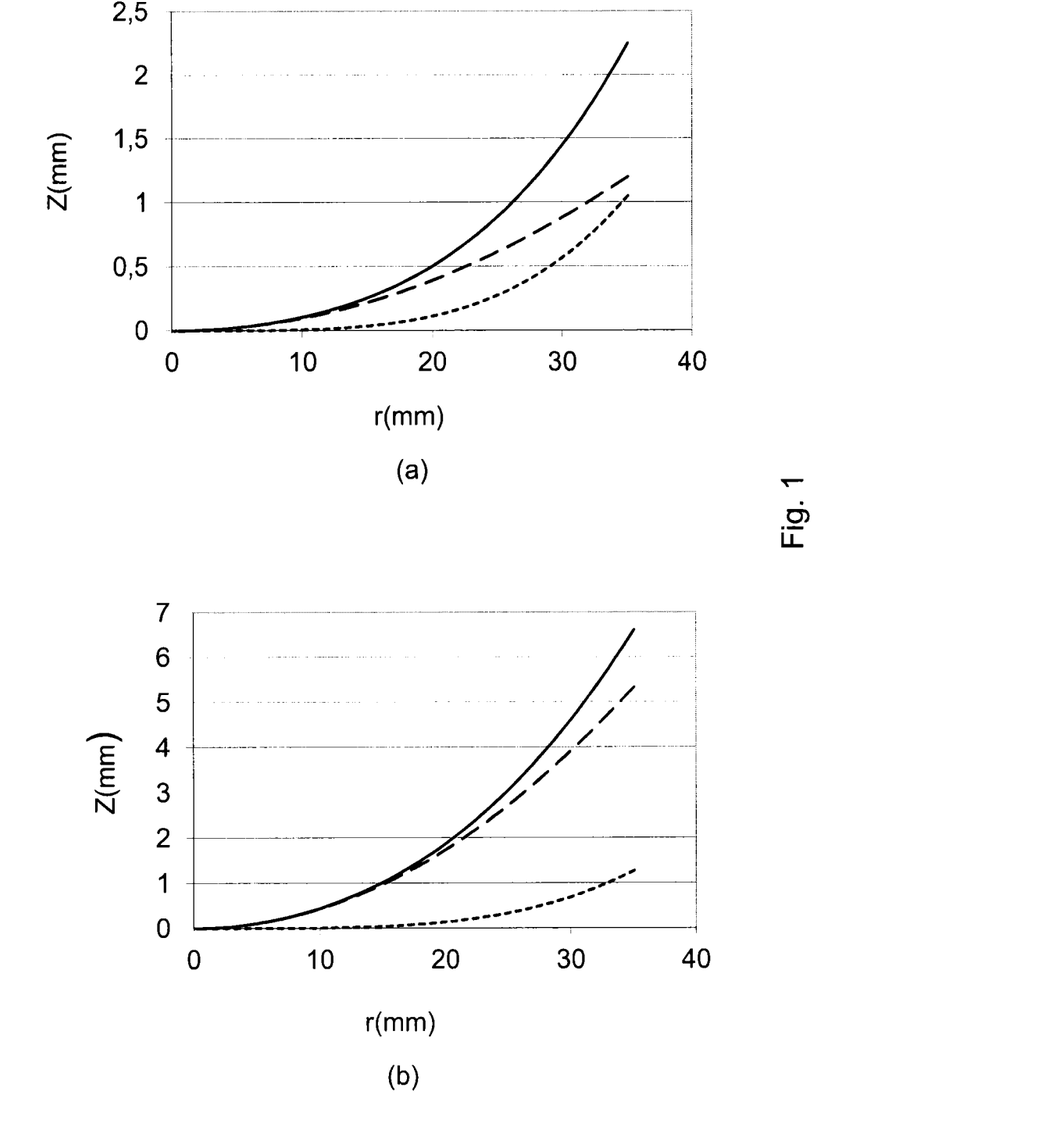
FIGS. 1(a)-(d) show four cross-section comparisons (z coordinate) of lens surfaces defined by a purely hyperbolic surface, a purely exponential surface and the combination of both.

In FIG. 1, graphs (a) to (d) schematically show the contribution made to a surface according to the invention by each of the hyperbolic and exponential components. Indeed, in these drawings the solid line represents the cross-section of the surface of the lens obtained according to the invention, the discontinuous line shows the hyperbolic component and the dotted line shows the exponential component. It is clearly observed that the hyperbolic component is the dominant component in the central part of the lens, whereas the exponential component allows introducing changes (which can be substantial) in the perimetric part of the lens. Furthermore, the combination of both components allows generating surfaces that could not be obtained with one of the components alone. The curves corresponding to the four figures have been calculated with the following starting data:

FIG. 1a: sphere: +8D, cylinder: 0D, base curve: 67.83mm, index: 1.6, merit function:

$$fm = \left[\sum_i \alpha_i m_i^2(\beta)\right]^{1/2}$$

including the oblique astigmatism value at 30°, weighted with a value 0.9, and the curvature of field value at 30°, weighted with a value 0.1.

FIG. 1b: sphere: +8 D, cylinder: −4 D, base curve: 67.833 mm, index: 1.6, merit function: the same as FIG. 1a.

FIG. 1c: sphere: −6 D, cylinder: 0 D, base curve: 498 mm, index: 1.6, merit function: the same as FIG. 1a.

FIG. 1d: sphere: −6 D, cylinder: −4 D, base curve: 498 mm, index: 1.6, merit function: the same as FIG. 1a.

Figure 2:
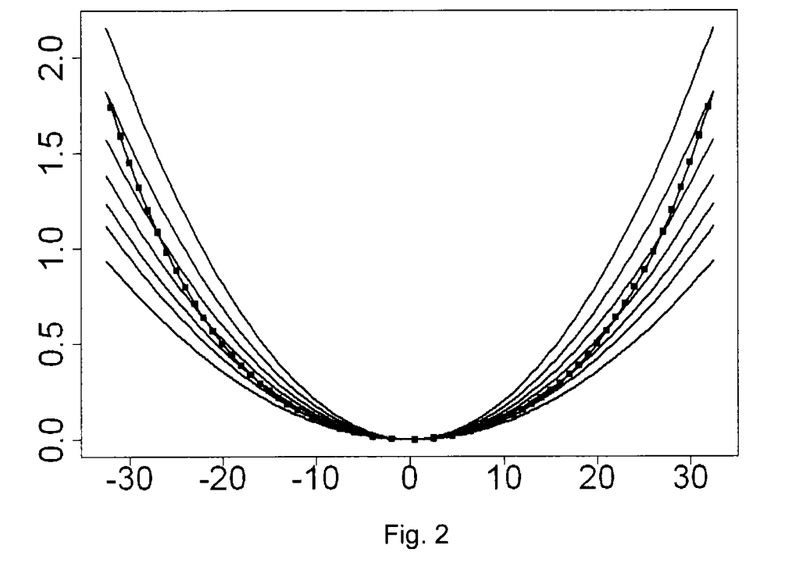
FIG. 2 shows a cross-section comparison of spherical lens surfaces and a surface according to the invention.
Figure 3:
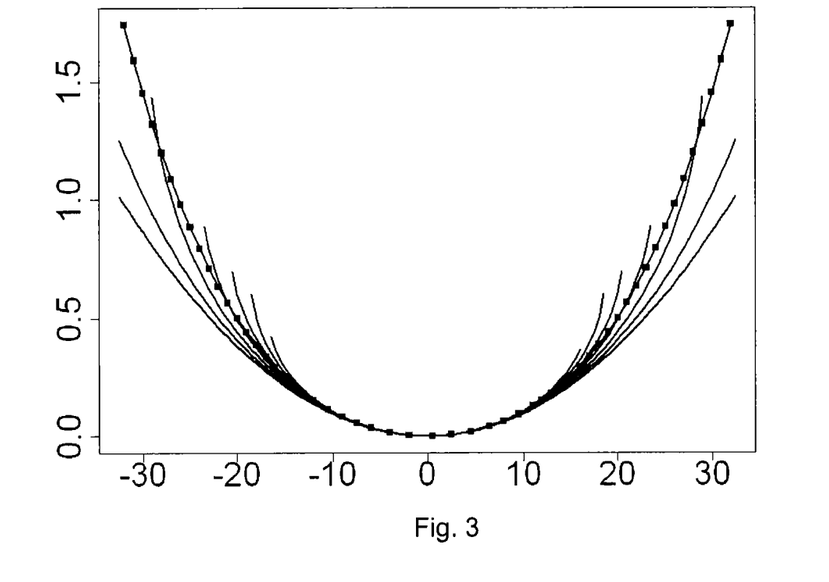
FIG. 3 shows a cross-section comparison of aspherical lens surfaces and a surface according to the invention.

In turn, in FIG. 2 depicts the sphere profiles with a plurality of radii of curvature (discontinuous lines) superimposed on the profile of a lens according to the invention, calculated from the following starting data: sphere: +8D, cylinder: −2.0D, base curve: 67.83 mm, index: 1.6, merit function: the same as FIG. 1a. Similarly, FIG. 3 depicts the aspheric profiles with a plurality of asphericites for a specific radius of curvature (discontinuous lines) superimposed on the profile of the lens according to the invention of FIG. 2. As can be seen, none of the spherical or aspherical curves can be superimposed on the curve of the surface according to the invention. Therefore, the surface according to the invention can offer improved optical properties with respect to spherical or aspherical lenses.

Figure 4:
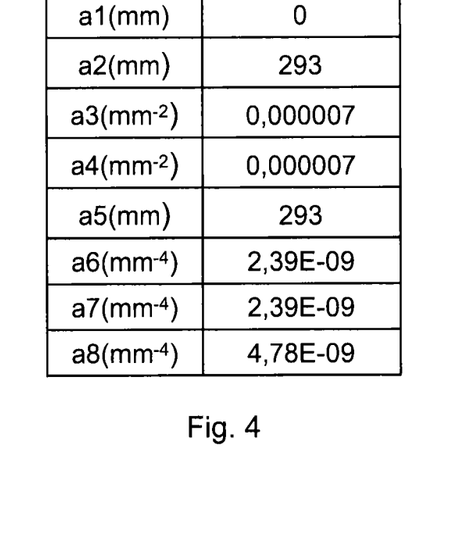
FIG. 4 shows a table with first values of coefficients $a_1$-$a_8$.
Figure 5:
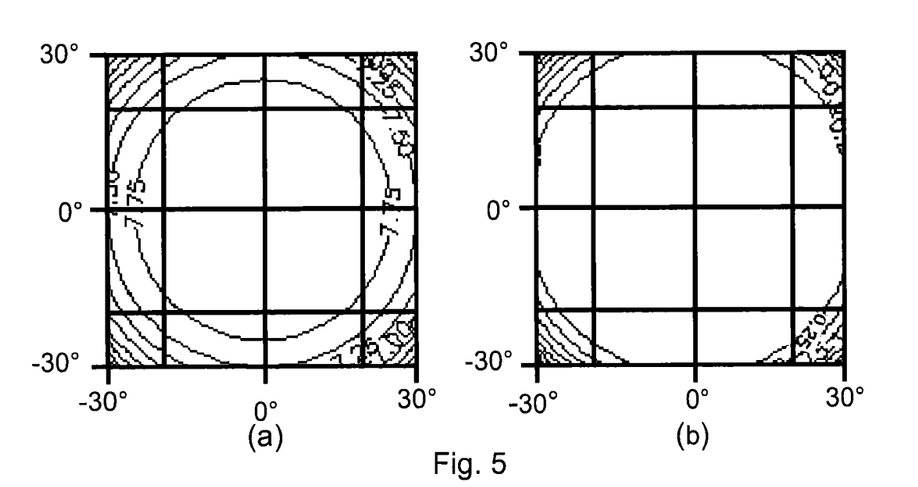

FIG. 4 shows the coefficients obtained for the case of a lens with a sphere value =8D, cylinder value =0D, base curve value =67.83 mm and refractive index n =1.6. An optimization has been performed with a merit function:

$$fm = \left[\sum_i \alpha_i m_i^2(\beta)\right]^{1/2}$$

including the oblique astigmatism value at 30°, weighted with a value 0.9, and the curvature of field value at 30°, weighted with a value 0.1. FIG. 5 shows the mean power (a) and astigmatism (b) maps up to 30° obtained with an analytical surface with the coefficients of FIG. 4.

Figure 6:
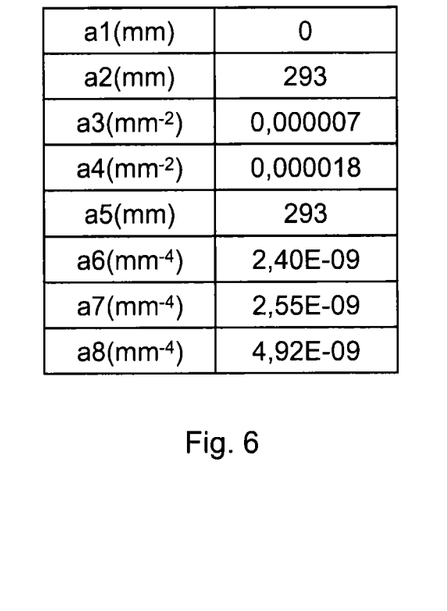
FIG. 6 shows a table with second values of coefficients $a_1$-$a_8$.
Figure 7:
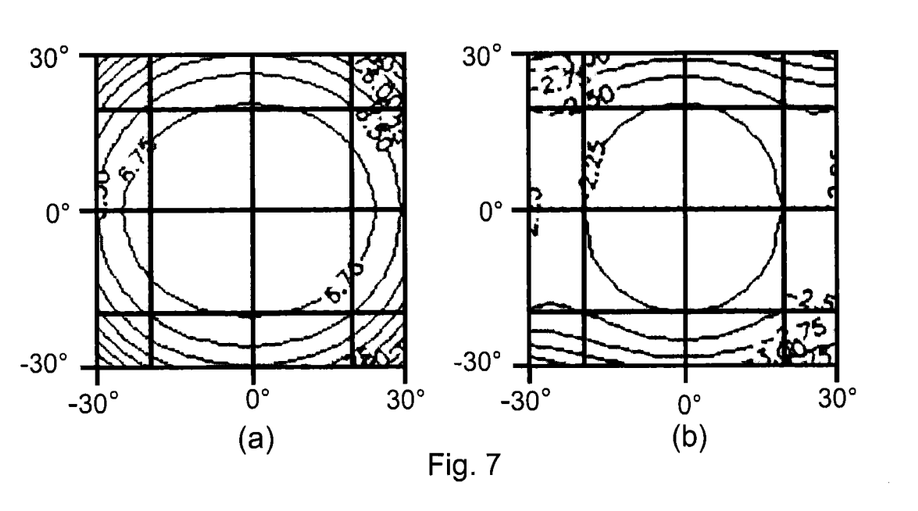

FIG. 6 shows the coefficients obtained for the case of a lens with a sphere value=8 D, cylinder value=−2 D, base curve value=67.83 mm and refractive index n=1.6. An optimization has been performed with the same merit function as in the previous example. FIG. 7 shows the mean power (a) and astigmatism (b) maps up to 30° obtained with an analytical surface with the coefficients of FIG. 6.

Figure 8:
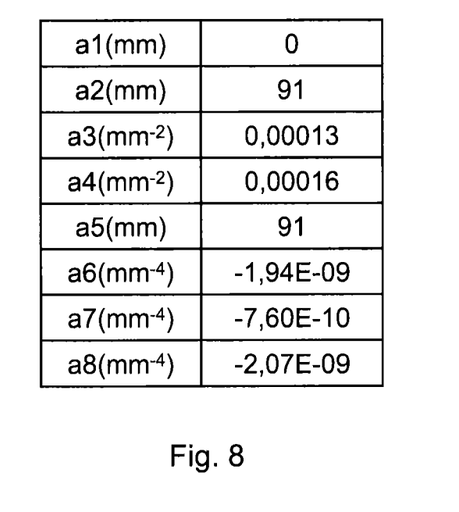
FIG. 8 shows a table with third values of coefficients $a_1$-$a_8$.
Figure 9:
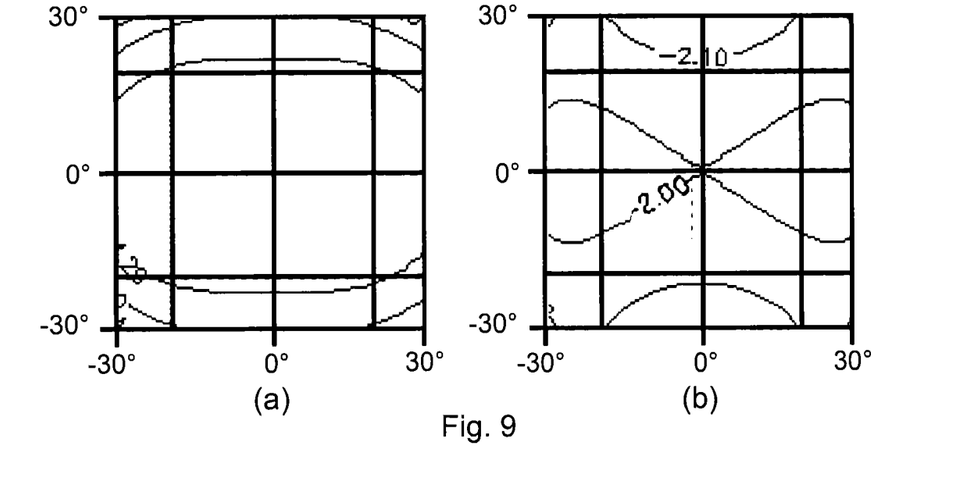

FIG. 8 shows the coefficients obtained for the case of a lens with a sphere value=−3.25 D, cylinder value=−2 D, base curve value=183.51 mm and refractive index n=1.6. An optimization has been performed with the same merit function as in the previous example. FIG. 9 shows the mean power (a) and astigmatism (b) maps up to 30° obtained with an analytical surface with the coefficients of FIG. 8.

FIGS. 10 to 17 show examples of base curve changes. In each of FIGS. 11, 13, 15 and 17, a spherical lens is compared with a lens with a surface according to the invention. The upper maps are the astigmatism maps ((a) and (b)), and the lower maps are the mean power maps ((c) and (d)). The maps on the left are the maps of the spherical lens ((a) and (c)) whereas the maps on the right are the maps of a lens with a surface according to the invention, obtained from the coefficients of Tables 10, 12, 14 and 16, respectively. In all the cases the same merit function has been used as in the previous examples.

Figure 10:
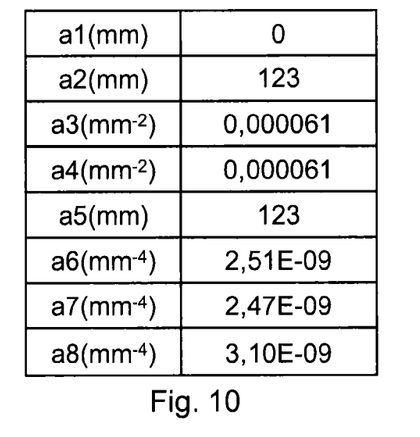
FIG. 10 shows a table with fourth values of coefficients $a_1$-$a_8$.
Figure 11:
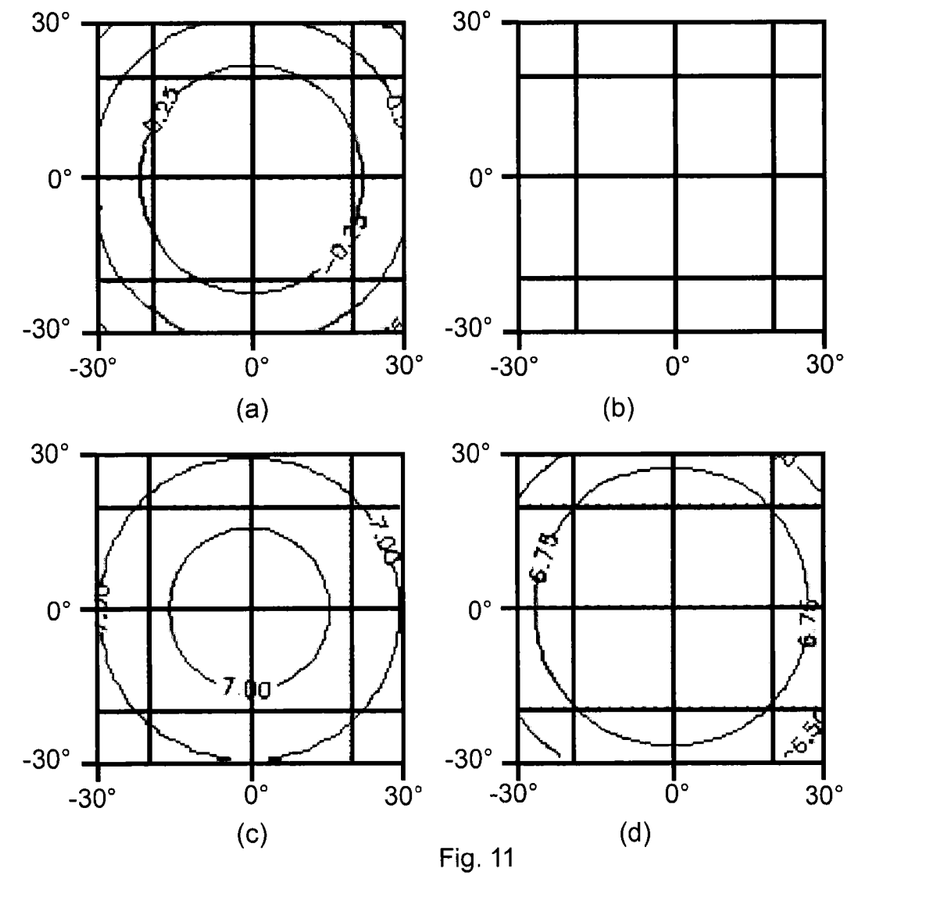
FIGS. 11(a)-(d) show a comparison of astigmatism and mean power maps, respectively, every 0.25 D, up to 30° obtained with a spherical surface ((a) and (c)) and with an analytical surface with the coefficients of FIG. 10 ((b) and (d)), respectively.
Figure 12:
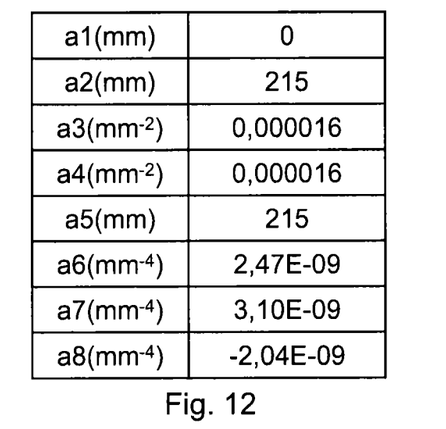
FIG. 12 shows a table with fifth values of coefficients $a_1$-$a_8$.
Figure 13:
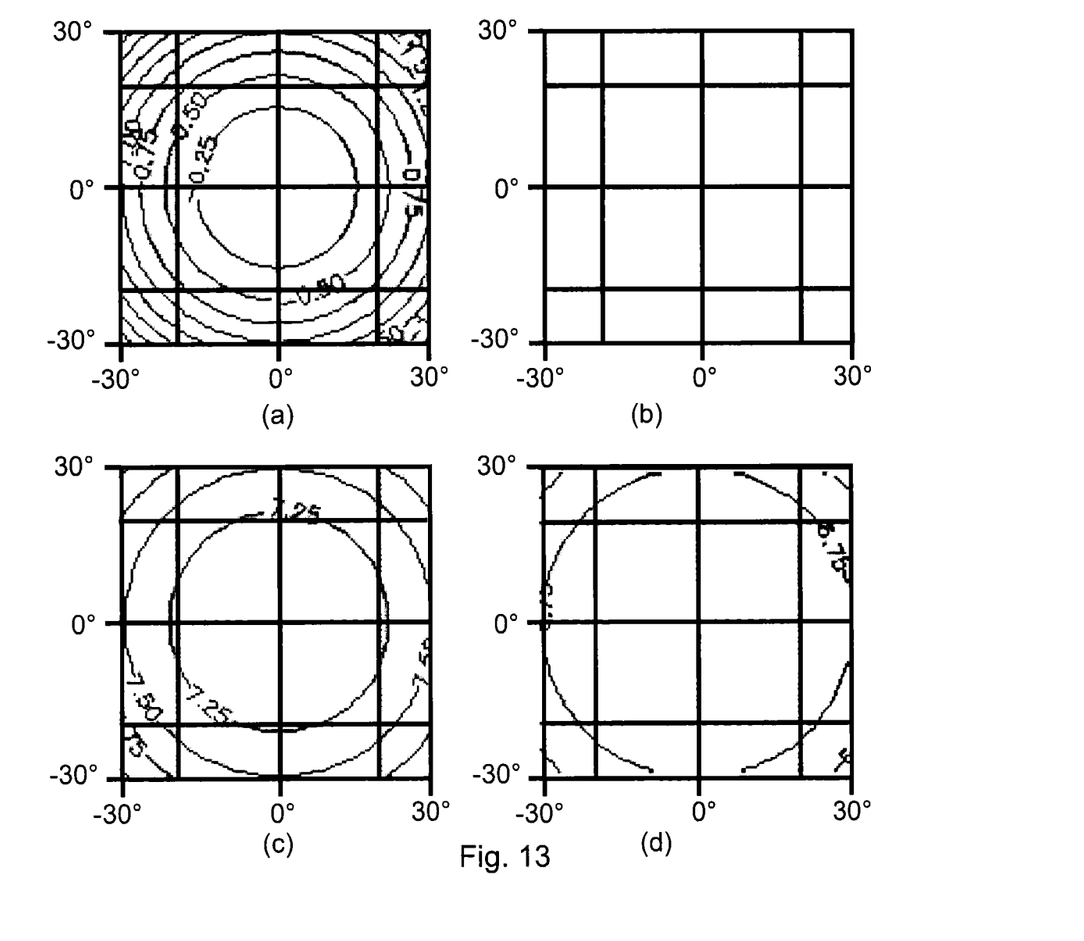
FIGS. 13(a)-(d) show a comparison of astigmatism and mean power maps, every 0.25 D, up to 30° obtained with a spherical surface ((a) and (c)) and with an analytical surface with the coefficients of FIG. 12 ((b) and (d)), respectively.

FIGS. 10 to 13 correspond to a lens with a sphere value=+7.0 D, cylinder value=0 D and refractive index n=1.6, where FIGS. 10 and 11 correspond to the case of a base curve of 54.36 mm, whereas FIGS. 12 and 13 correspond to the case of a base curve of 67.83 mm.

Figure 14:
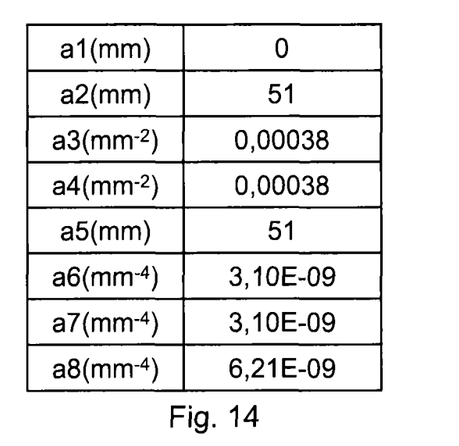
FIG. 14 shows a table with sixth values of coefficients $a_1$-$a_8$.
Figure 15:
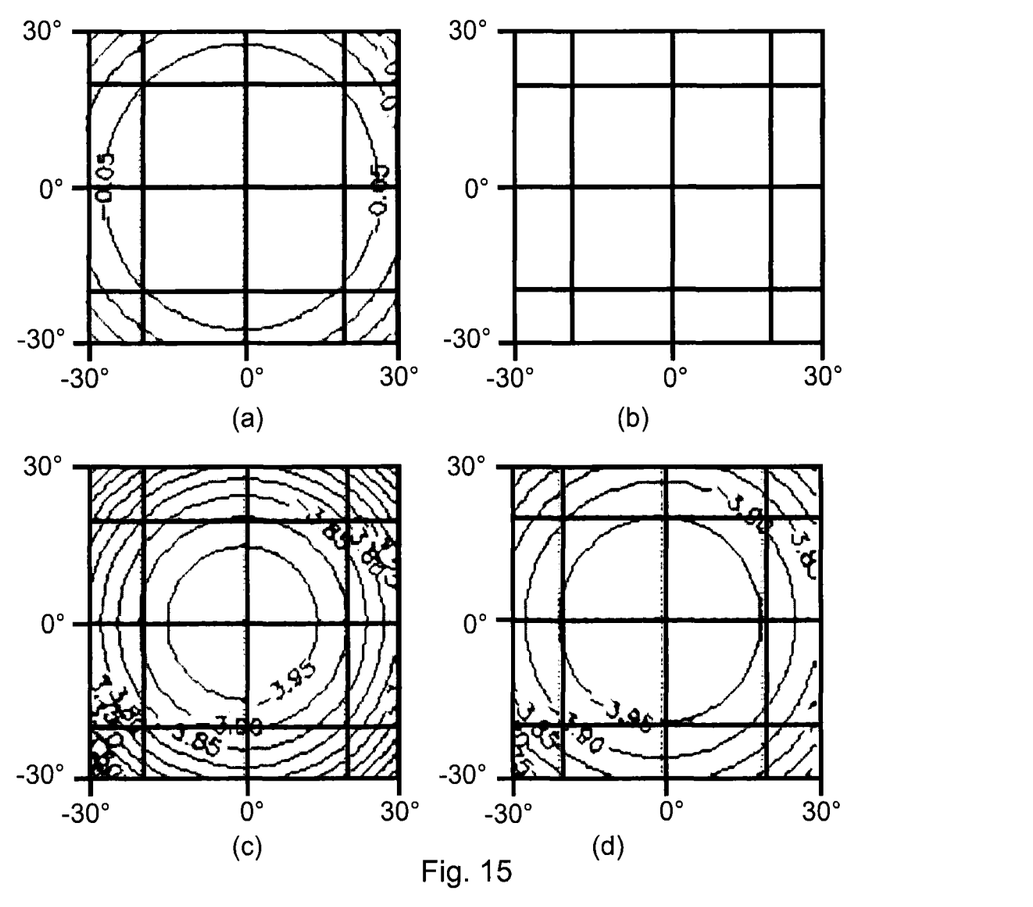
FIGS. 15(a)-(d) show a comparison of astigmatism and mean power maps, every 0.05 D, up to 30° obtained with a spherical surface ((a) and (c)) and with an analytical surface with the coefficients of FIG. 14 ((b) and (d)), respectively.
Figure 16:
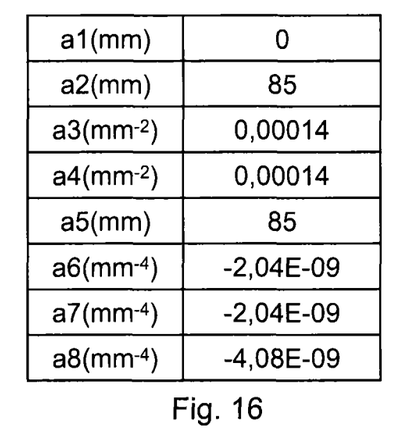
FIG. 16 shows a table with seventh values of coefficients $a_1$-$a_8$.
Figure 17:
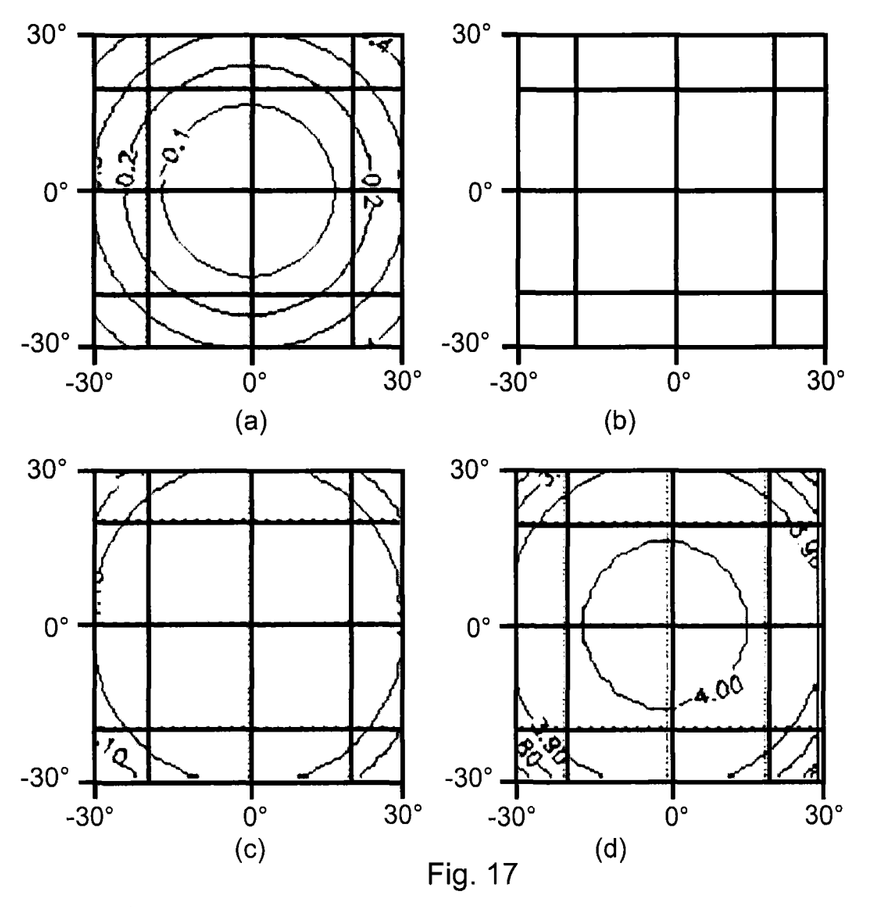
FIGS. 17(a)-(d) show a comparison of astigmatism and mean power maps, every 0.10 D, up to 30° obtained with a spherical surface ((a) and (c)) and with an analytical surface with the coefficients of FIG. 16 ((b) and (d)), respectively.

In turn, FIGS. 14 to 17 correspond to a lens with a sphere value=−4.0 D, cylinder value=0 D and refractive index n=1.6, where FIGS. 14 and 15 correspond to the case of a base curve of 79.73 mm, whereas FIGS. 16 and 17 correspond to the case of a base curve of 183.51 mm.

Figure 18:
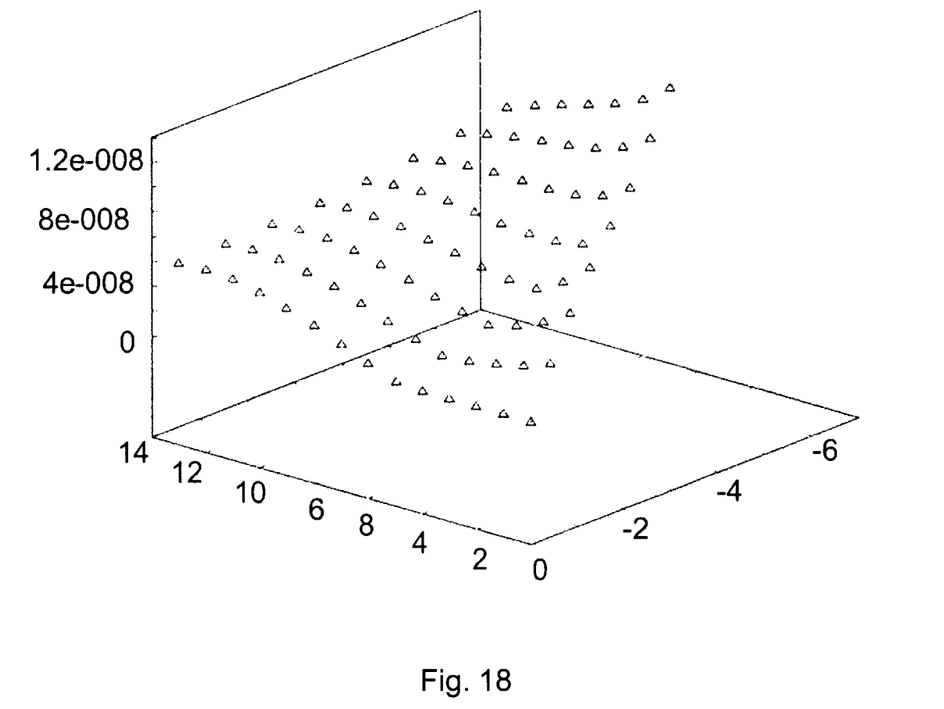
FIG. 18 shows a variation graph of coefficient $a_7$ depending on the sphere and cylinder values for index 1.7.

FIG. 18 shows a variation graph of coefficient $a_7$ depending on the sphere value (X axis) and cylinder values (Y axis), in a case in which the base curve is 52.3 mm and the refractive index n is 1.7. The same merit function has been used to calculate $a_7$ as in the previous examples.

Figure 19:
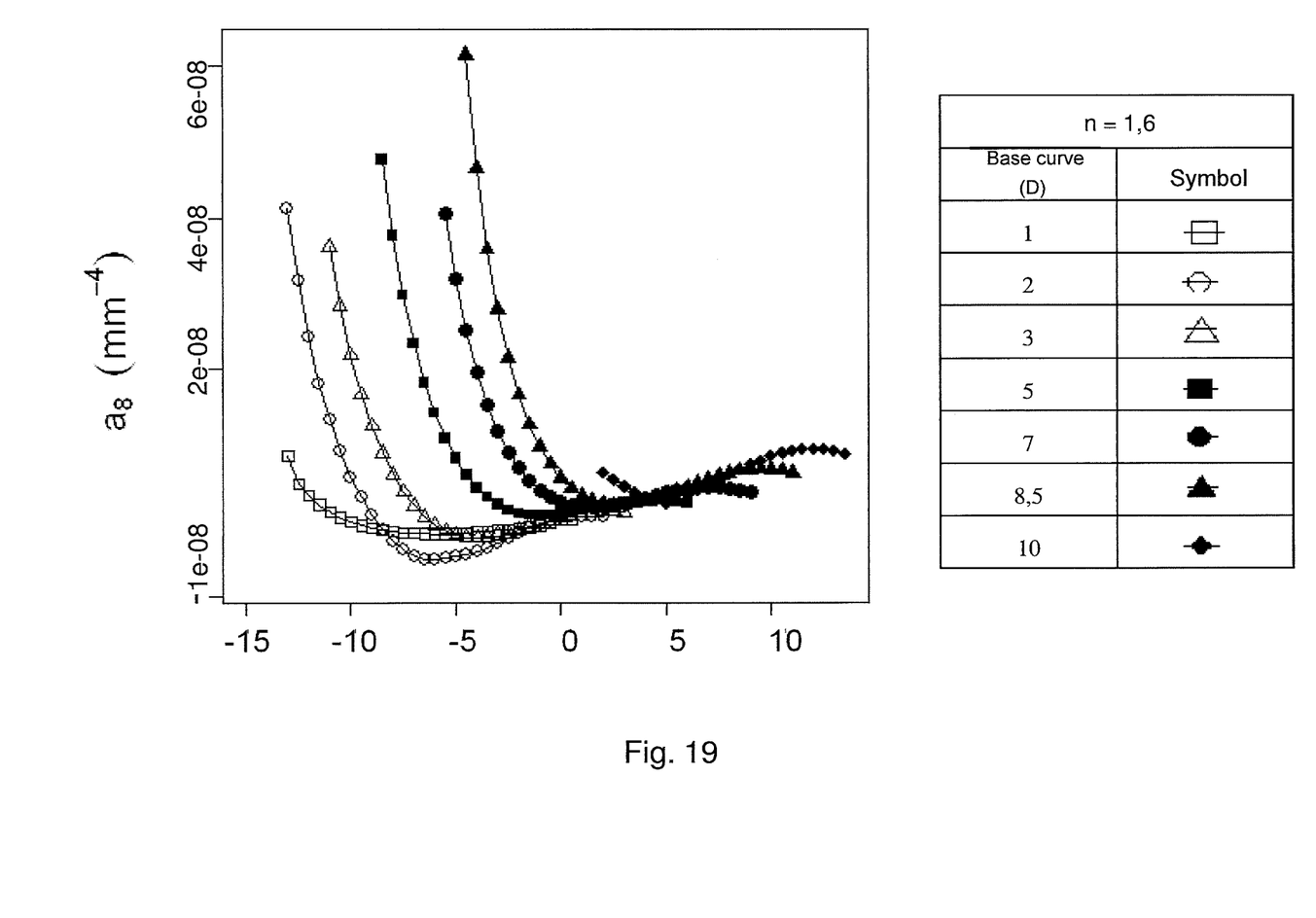
FIG. 19 shows a variation graph of coefficient $a_8$ depending on the sphere values for index 1.6.
Figure 20:
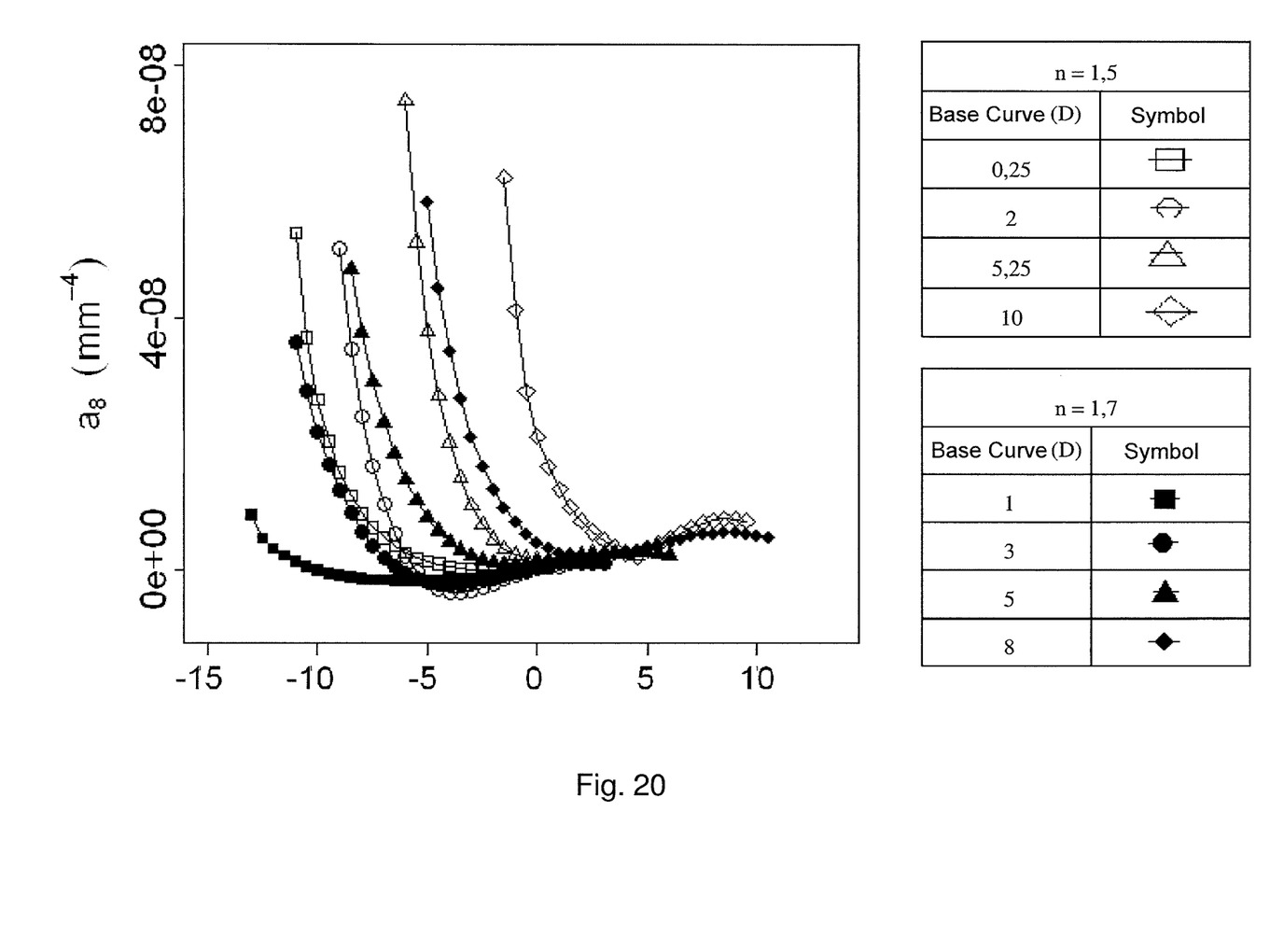
FIG. 20 shows a comparative variation graph of coefficient $a_8$ depending on the sphere values for two different indices.
Figure 21:
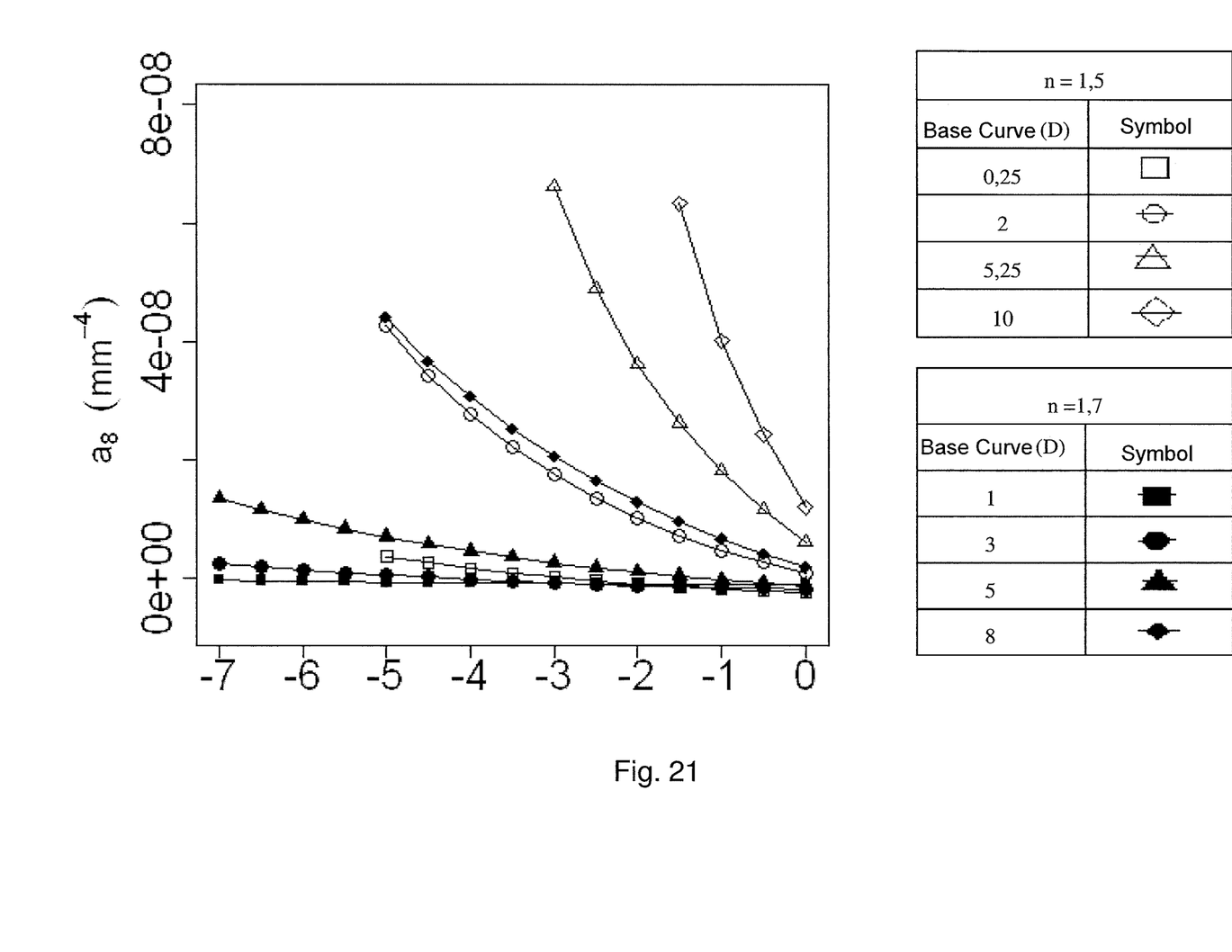
FIG. 21 shows a comparative variation graph of coefficient $a_8$ depending on the cylinder values for two different indices.

FIG. 19 shows a variation graph of coefficient $a_8$ depending on the sphere values (X axis) for various base curves. The refractive index n is 1.7 and the cylinder value is −2.0 D. The same merit function has been used to calculate $a_8$ as in the previous examples. FIG. 20 shows the comparative results between two indices (1.5 and 1.7) depending on the sphere values (X axis) (cylinder value=−2.0 D), whereas FIG. 21 shows the results depending on the cylinder values (X axis) (sphere value=−2.0 D).

The invention claimed is:

1. A method for making a monofocal ophthalmic lens, comprising the steps of:
   defining a surface of the lens by the following formula (1):
   $$f(x,y)=a_1+a_2\sqrt{1-a_3x^2-a_4y^2}+a_5\exp\{a_6x^4+a_7y^4+a_8x^2y^2\} \quad (1)$$
   wherein x and y are perpendicular optical axes of the lens in a plane, and
   wherein $a_1$, -$a_8$ are coefficients;
   making $a_5$ other than 0 and at least one of $a_6$, $a_7$ and $a_8$ other than 0;
   receiving a monofocal ophthalmic lens; and
   forming the surface on the lens according to the formula.

2. The method according to claim 1, wherein said coefficients are calculated by an iterative calculation comprising the following steps:
   [a] setting a value for a refractive index of the ophthalmic lens and for a base curve that will be used to manufacture the ophthalmic lens,
   [b] setting sphere, cylinder and cylinder axis values for the ophthalmic lens,
   [c] setting initial nominal values for $a_1$-$a_8$,
   [d] calculating at least one optical property of a lens with said values,
   [e] calculating a value of a merit function by the following formula (2):
   $$fm = \left[\sum_i \alpha_i m_i^2(\beta)\right]^{1/2} \quad (2)$$
   where $m_i$ is a value of said at least one optical property at a specific viewing angle $\beta$ with respect to an optical axis of the lens, and $\alpha_i$ is a weighting value,
   [f] optimizing said merit function by setting new nominal values for said coefficients $a_1$-$a_8$, and
   [g] repeating steps [c] to [f] until obtaining the desired optimization level.

3. The method according to claim 2, wherein said merit function includes an oblique astigmatism value at 30°, and the $\alpha_i$ value for the oblique astigmatism value is between 0.8 and 0.98.

4. The method according to claim 2 or 3, wherein said merit function includes a curvature of field value at 30°, and the $\alpha_i$ value for the curvature of field value is between 0.02 and 0.2.

5. The method according to any one of claims 1, 2, and 3, wherein said surface is a concave surface of said lens.

6. The method according to claim 5, wherein $a_1$ is equal to 0, $a_2$ is equal to a radius of curvature in a center of said surface, with a negative sign, and $a_5$ is equal to the radius of curvature in the center of said surface.

7. The method according to claim 1, wherein a6 is between $2\times10^{-8}$ and $5\times10^{-8}$ mm$^{-4}$.

8. The method according to claim 1, wherein a7 is between $-2\times10^{-8}$ and $1.2\times10^{-7}$ mm$^{-4}$.

9. The method according to claim 1 wherein $a^8$ is between $-2\times10^{-8}$ and $1.2\times10^{-7}$ mm$^{-4}$.

10. The method according to claim 1, wherein each of the coefficients of the formula (1) has a value between +/−30% of a corresponding nominal value obtained from said optimization.

11. A lens, comprising:
    a monofocal lens having a surface,
    wherein said surface is defined by the following formula:
    $$f(x,y)=a_1+a_2\sqrt{1-a_3x^2-a_4y^2}+a_5\exp\{a_6x^4+a_7y^4+a_8x^2y^2\}$$
    wherein x and y are perpendicular optical axes of the lens in a plane,
    wherein $a_1$-$a_8$ are coefficients, and
    wherein $a_5$ is other than 0 and at least one of $a_6$ $a_7$ and $a_8$ is other than 0.

12. The method according to claim 11, wherein said coefficients are calculated by an iterative calculation comprising the following steps:
    [a] setting a value for a refractive index of the ophthalmic lens and for a base curve that will be used to manufacture the ophthalmic lens,
    [b] setting sphere, cylinder and cylinder axis values for the ophthalmic lens,
    [c] setting initial nominal values for $a_1$-$a_8$,
    [d] calculating at least one optical property of a lens with said values,
    [e] calculating a value of a merit function by the following formula (2):
    $$fm = \left[\sum_i \alpha_i m_i^2(\beta)\right]^{1/2} \quad (2)$$
    where $m_i$ is a value of said at least one optical property at a specific viewing angle $\beta$ with respect to an optical axis of the lens, and $\alpha_i$ is a weighting value,
    [f] optimizing said merit function by setting new nominal values for said coefficients $a_1$-$a_8$, and
    [g] repeating steps [c] to [f] until obtaining the desired optimization level.

13. The method according to claim 11, wherein said merit function includes an oblique astigmatism value at 30°, and the $\alpha_i$ value for the oblique astigmatism value is between 0.8 and 0.98.

14. The method according to claim 11, wherein $a_1$ is equal to 0, $a_2$ is equal to a radius of curvature in a center of said surface, with a negative sign, and $a_5$ is equal to the radius of curvature in the center of said surface.

* * * * *